(12) United States Patent
Madison

(10) Patent No.: US 11,842,653 B2
(45) Date of Patent: Dec. 12, 2023

(54) SYSTEMS AND METHODS FOR VIRTUAL REALITY BASED DRIVER SITUATIONAL AWARENESS RECOVERY TRAINING

(71) Applicant: STATE FARM MUTUAL AUTOMOBILE INSURANCE COMPANY, Bloomington, IL (US)

(72) Inventor: Anna Marie Madison, Morton, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 86 days.

(21) Appl. No.: 17/516,488

(22) Filed: Nov. 1, 2021

(65) Prior Publication Data

US 2022/0051589 A1 Feb. 17, 2022

Related U.S. Application Data

(63) Continuation of application No. 16/288,734, filed on Feb. 28, 2019, now Pat. No. 11,164,479.

(51) Int. Cl.
| | | |
|---|---|---|
| *G09B 19/16* | (2006.01) | |
| *B60W 40/09* | (2012.01) | |
| *G06T 19/00* | (2011.01) | |
| *G02B 27/01* | (2006.01) | |
| *G07C 5/08* | (2006.01) | |
| *B60W 40/08* | (2012.01) | |

(52) U.S. Cl.
CPC .......... *G09B 19/167* (2013.01); *B60W 40/09* (2013.01); *G02B 27/017* (2013.01); *G06T 19/006* (2013.01); *G07C 5/0841* (2013.01); *B60W 2040/0872* (2013.01)

(58) Field of Classification Search
CPC .......... B60W 40/09; B60W 2040/0872; G02B 27/017; G06T 19/006; G07C 5/0841
See application file for complete search history.

(56) References Cited

U.S. PATENT DOCUMENTS

| | | |
|---|---|---|
| 10,431,023 B1 | 10/2019 | Watson et al. |
| 2014/0186810 A1 | 7/2014 | Falash et al. |
| 2018/0118219 A1 | 5/2018 | Hiei et al. |
| 2019/0304188 A1 | 10/2019 | Bridgeman et al. |

*Primary Examiner* — Timothy A Musselman
(74) *Attorney, Agent, or Firm* — MARSHALL, GERSTEIN & BORUN LLP

(57) ABSTRACT

A method for autonomous vehicle driver situational awareness recovery training includes receiving an input parameter; determining a simulation; receiving user performance data; and analyzing the user performance data to determine a driving competency score. A method for autonomous vehicle driver situational awareness recovery training includes receiving an input parameter; executing a simulation; and recording user performance data. A system includes a processor a display device; and a non-transitory computer-readable medium storing instructions that, when executed by the one or more processors, cause the system to receive an input parameter; execute a simulation; and record user performance data.

20 Claims, 6 Drawing Sheets

SYSTEMS AND METHODS FOR VIRTUAL REALITY BASED DRIVER SITUATIONAL AWARENESS RECOVERY TRAINING

CROSS REFERENCE TO RELATED APPLICATION

This application is a continuation of U.S. patent application Ser. No. 16/288,734, filed on Feb. 28, 2019, entitled "SYSTEMS AND METHODS FOR VIRTUAL REALITY BASED DRIVER SITUATIONAL AWARENESS RECOVERY TRAINING," the entire contents of which are hereby incorporated herein by reference.

FIELD OF DISCLOSURE

The present disclosure generally relates to systems and methods for training drivers, and, more particularly, to training drivers in an environment that simulates an autonomous vehicle reverting control back to the driver.

BACKGROUND

Drivers typically are required to complete one or more training courses to obtain a license for operating a vehicle and/or qualify for insurance coverage and discounts, among other reasons. Even licensed drivers are sometimes required to take refresher courses, for example, as the result of receiving a moving violation.

Conventional driver training programs typically have a two-part format. First, a student will learn the driving rules (e.g., the rules of the road) and other driving-related skills in a classroom setting or through written materials. Later, the student will take an on-road driving test with an instructor, where the student is required to demonstrate the skills she previously learned in the classroom. Such instruction is typical for first time drivers. Alternatively, a student may learn the driving rules and driving-related skills in a virtual reality instructional lesson, coupled with a virtual reality driving scenario to practice the driving rules and skills taught in the instructional lesson. In both cases, however, the student is taught and practices driving related skills with a vehicle in which the student must remain in control of the vehicle at all times managing situational awareness and operation of the vehicle in response to situations that may arise while driving. However, with the development of autonomous vehicles, it is expected that drivers, both new and experienced, will need to learn new driving-related skills particular to autonomous vehicles, and more particularly with respect to situational awareness. That is, an autonomous vehicle may have different levels of control: one level vehicle control in which the automated driving system of the autonomous vehicle monitors the driving environment and controls the vehicle, and another level of vehicle control in which the driver is required to monitor the driving environment and control the vehicle. There are times when the autonomous vehicle will automatically transition from an autonomous level of vehicle control to a manual level of vehicle control due to, for example, computer vision (CV) failure to understand the surrounding environment (e.g., due to rain, snow, glare, failure to recognize an object resulting in the CV having a low confidence level, etc.). This represents not only a hazard for the occupants of the autonomous vehicle, but also a hazard for surrounding people, vehicles and property, particularly as autonomous vehicle behave differently in terms of driving as compared to human drivers. As such, a human driver of the autonomous vehicle must retake full control of the vehicle. However, even if the driver of the autonomous vehicle is attentive (i.e., not distracted by a secondary task, such as watching a video), the driver may still not be processing the driving environment as if he/she was in full control of the vehicle. Therefore, the driver must possess the driving skill of situational awareness recovery in order to immediately recognize the driving environment and execute the operational and tactical aspects of driving (e.g., avoiding a collision, staying in a driving lane, controlling speed, etc.) in response to the transition from autonomous driving to manual driving.

Thus, while simulators have been developed for training driving students, existing simulators are not effective in replicating driving conditions or behavior of autonomous vehicles, in part because they typically employ vehicle that constantly require full control by the driver. As a result, drivers do not possess the driving skill of situational awareness recovery, and existing methods of driver training do not include lessons and demonstrations to teach situational awareness recovery.

The present disclosure sets forth systems and methods for training drivers, embodying advantageous alternatives to existing driver training systems and methods, and that may address one or more of the challenges or needs mentioned herein, as well as provide other benefits and advantages.

SUMMARY

In one aspect, a computer-implemented method for autonomous vehicle driver situational awareness recovery training includes (a) receiving, via a computer network, at least one input parameter corresponding to at least one feature to be rendered during a driving simulation; (b) determining, by one or more processors, a virtual reality driving simulation comprising (i) an autonomous vehicle having one or more levels of vehicle control (ii) a driving scenario; (c) receiving, via the computer network, user performance data recorded during execution of the virtual reality driving simulation on at least one head-mounted virtual reality device; and (d) analyzing, by the one or more processors, the user performance data to determine a driving competency score measuring user recovery of situational awareness during the driving scenario of the virtual reality driving simulation.

In another aspect, a computer-implemented method for autonomous vehicle driver situational awareness recovery training includes (a) receiving, via one or more client devices, at least one input parameter corresponding to at least one feature to be rendered during a virtual reality driving simulation; (b) executing, via the one or more client devices, the virtual reality driving simulation such that a head-mounted virtual reality device renders at least: (i) an autonomous vehicle having a plurality of levels of vehicle control to be rendered in virtual reality, and (ii) a driving scenario to be rendered in virtual reality; and (c) recording, via the one or more client devices, user performance data during execution of the virtual reality driving simulation.

In yet another aspect, a system for driver training includes one or more processors; a head-mounted virtual reality display device; and a non-transitory computer-readable medium storing instructions that, when executed by the one or more processors, cause the system to: (a) receive at least one input parameter corresponding to at least one feature to be rendered during a virtual reality driving simulation; (b) execute the virtual reality driving simulation such that a head-mounted virtual reality device renders at least: (i) an autonomous vehicle having a plurality of levels of vehicle control to be rendered in virtual reality, and (ii) a driving scenario to be rendered in virtual reality; and (c) record user performance data during execution of the virtual reality driving simulation.

BRIEF DESCRIPTION OF THE DRAWINGS

It is believed that the disclosure will be more fully understood from the following description taken in conjunction with the accompanying drawings. Some of the drawings may have been simplified by the omission of selected elements for the purpose of more clearly showing other elements. Such omissions of elements in some drawings are not necessarily indicative of the presence or absence of particular elements in any of the example embodiments, except as may be explicitly delineated in the corresponding written description. Also, none of the drawings are necessarily to scale.

DETAILED DESCRIPTION

The systems and methods disclosed herein generally relate to providing driver training in an environment that simulates real-life driving conditions for an autonomous vehicle, and particularly a transition from autonomous vehicle control to manual vehicle control. The presently disclosed systems and methods may utilize a head-mounted virtual reality device to increase fidelity of the simulation, thereby providing the user with a more realistic experience. Furthermore, the systems and methods disclosed herein may allow the user to practice situational awareness recovery, in which a user must monitor the driving environment and control the vehicle after transitioning from autonomous driving to manual driving. This aspect of the driver training helps improve responses to behaviors particular to autonomous vehicles. Additionally, the presently disclosed systems and methods may provide the ability to record user performance data during the practice portion of the simulation and subsequently assess the user's situational awareness recovery based on the user performance data. Accordingly, the presently disclosed systems and methods may dynamically and automatically adapt the simulation to reflect the user's progress in learning. Additionally, the presently disclosed systems and methods may be configured to simulate hazardous driving scenarios that would otherwise be too dangerous to practice in real life, thereby providing the user with an opportunity to practice and hone skills critical for avoiding a driving accidents and crashes once the vehicle transitions from autonomous control to manual control. In addition, the relatively low cost and mobility of a head-mounted virtual reality device facilitates its implementation in a wide variety of settings, and reduces or eliminates the need for specialized driver training schools for autonomous vehicles, while allowing both new and experienced drivers to train for autonomous vehicles, where they may be used to non-autonomous vehicles. Additionally, the presently disclosed systems and methods can utilize computer networks for collecting, compiling, analyzing, and/or communicating data related to the driving simulation, which can reduce the data processing burden on front-end components such as the head-mounted virtual reality device, leverage distributed computing capabilities, and/or provide the ability to update the driving simulation in response to real-time user performance data and/or background information on the user stored in remote databases. Accordingly, the presently disclosed systems and methods are directed to an improvement to computer functionality, and improve the functioning of conventional computers.

I. Example System for Situational Awareness Recovery Driver Training

Figure 1:
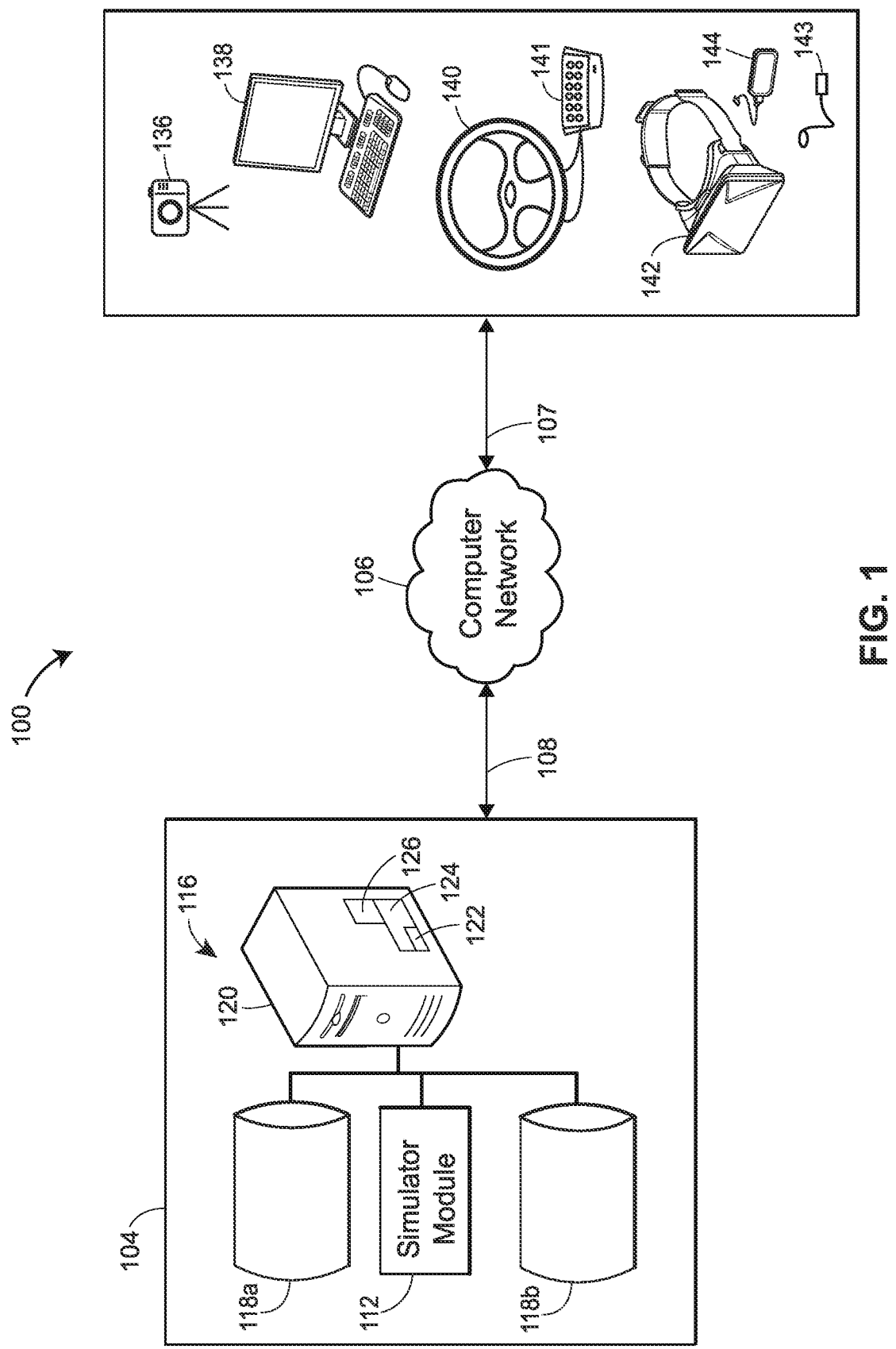
FIG. 1 is a block diagram illustrating one embodiment of a system for driver training in accordance with principles of the present disclosure.

FIG. 1 is a block diagram depicting an embodiment of a system 100 for virtual reality based driver training in accordance with principles of the present disclosure. Although FIG. 1 depicts certain devices and components, it will be appreciated that additional or alternative devices and components are envisioned.

The system 100 may include various software, computer-readable instructions, hardware components, and/or modules that may employ the software and/or computer-readable instructions to implement a virtual reality driving simulation. The various modules may be implemented as computer-readable storage memories containing computer-readable instructions for execution by one or more processors of the system 100. The modules may perform various tasks associated with a virtual reality driving simulator, as described in more detail below. The system 100 may also include both hardware and software applications, as well as various data communications channels for communicating data between the various hardware and software components.

More particularly, the system 100 may include client devices 136, 138, 140, 141, 142, 143, and/or 144 as front-end components and back-end components 104 in communication with each other via a computer network 106. The computer network 106 may facilitate data communications in accordance with any suitable number and type of compatible communication protocols. Accordingly, links 107 and 108 may represent wired links, wireless links, or any suitable combination thereof. For example, the computer network 106 may include one or more telecommunication networks, nodes, and/or links used to facilitate data transfers, and may facilitate a connection to the Internet for devices connected thereto. The computer network 106 may include any suitable number and type of interconnected network components that form an aggregate network system, such as the Internet, a wireless telephony network (e.g., GSM, CDMA, LTE, etc.), a Wi-Fi network (e.g., via one or more IEEE 802.11 Standards), a WiMAX network, a proprietary network, a secure public internet, a mobile-based network, a private network, a virtual private network, a peer-to-peer network, a file sharing network, dedicated access lines, plain ordinary telephone lines, satellite links, cellular base stations, public switched telephone networks (PSTN), a local area network (LAN), a metropolitan area network (MAN), a wide area network (WAN), or any suitable combination thereof. In an embodiment where the computer network 106 comprises the Internet, data communication may take place over the computer network 106 via an Internet communication protocol.

The client devices 136-144 may include, by way of example, a head-tracking unit (HTU) 136 (e.g., a digital camera, webcam, smart-phone, laptop computer, portable media player, wearable computing device, etc.), a computer 138 (e.g., a desktop computer, laptop computer, tablet computer, smartphone, gaming-class PC, Xbox® gaming console, PlayStation® gaming console, etc.), a steering wheel 140 (e.g., a gaming steering wheel), pedals 141 (e.g., gaming pedals), a Virtual Reality (VR) device 142 (e.g., Oculus Rift®, Google Cardboard®, HTC Vive®, Samsung Gear VR®, Sony PlayStation VR®, Microsoft HoloLens®, etc.), a physiological sensor (e.g., a heart rate monitor, breathing sensor, etc.), and a motion-sensing (MS) device 144 mounted directly on the VR device 142 (e.g., a Leap Motion® device, etc.). It is noted that any mobile device (e.g., a smartphone, smartwatch, personal digital assistant (PDA), etc.) appropriately configured may interact with the system 100 as an additional client device or as one or more of the client devices 136-144.

The HTU 136 may be configured as a standalone device or can be installed as part of the computer 138. In various embodiments the HTU 136 can be any one of a motion sensing device (e.g., a Microsoft® Kinect 2, Oculus, HTC Vive, etc.), web-cam, smartphone, tablet, digital camera, structured light system, etc. In some embodiments the HTU 136 may include virtual reality (VR), augmented reality (AR), and/or implanted reality (IR) components. The HTU 136 may be configured to communicate with other devices in the system 100 through wireless and/or wired connections. The HTU 136 may be configured to detect and record data representative of the movement of the head of the user during a driving simulation. In addition to, or as an alternative to, tracking the head movement of the user during the driving simulation, the HTU 136 may be configured to detect and record data representative of movement of one or more arms of the user during the driving simulation, movement of one or more hands of the user during the driving simulation, movement of a torso of the user during the driving simulation, or any combination thereof. The recorded movement data may be stored by the HTU 136 and/or transmitted by the HTU 136 to be stored elsewhere, including, for example, in databases 118*a* and/or 118*b*. The recorded movement data may be analyzed by components of the driving simulator system 100.

In some embodiments, the computer 138 may be a desktop computer or a laptop computer. The driving simulator system 100 may require the computer 138 to include performance-oriented components such as a high-end CPU and/or one or more video cards. The performance-oriented features may be necessary to avoid latency in the driving simulations, which can lead to latency-related simulator sickness. The features that may be required for the computer 138 can be these commonly associated with a "gaming-class PC." In some embodiments, the computer 138 may be a gaming console such as a more recent generation of the Xbox® gaming console or the PlayStation® gaming console. The computer 138 may be able to communicate with the other client devices 136, 140, 141, 142, 143, and/or 144 and/or the backend components 104. The computer 138 may also include a graphical user interface (GUI) 110 and/or may be installed with a simulator module 112. In some embodiments, the GUI 110 may rendered by the VR device 142.

The computer 138 may be configured for inputting various input parameters necessary for implementing the driving simulation. The input parameters may include a username and password provided by a user upon log-in to associate driving competency assessments to a user profile. Alternatively, or additionally, the input parameters may specify various aspects of the simulation to be rendered by the driving simulator. The input parameters may also be received via the other client devices 136, 140, 141, 142, 143, and/or 144.

The steering wheel 140 and pedals 141 may be configured to receive the user's input during a simulation. In some embodiments, the steering wheel 140 and/or pedals 141 may be commonly available gaming hardware such as the Logitech® G27 Racing Wheel. The steering wheel 140 and/or pedals 141 may include a wired connection (e.g., HDMI, USB, etc.) and/or wireless connection to the computer 138 and/or the other client devices 136, 142, 143, and/or 144.

The VR device 142 may be a head-mounted device configured to render a virtual reality environment for the user. The VR device 142 may include a stereoscopic display configured to convey depth perception (i.e., three dimensionality (3-D)) to the user and provide a 360 degree field of view, head tracking sensors (e.g., gyroscopes, accelerometers, structured light systems, etc.), eye tracking sensors, and/or stereo speakers. In some embodiments, the stereoscopic display may incorporate a low latency liquid crystal display (LCD) screen. The VR device 142 may include a wired connection (e.g., HDMI, USB, etc.) and/or wireless connection to the computer 138 and/or the other client devices 136, 140, 141, 143, and/or 144. In some embodiments, the VR device 142 may incorporate a commercially available VR device including, but not limited to, the Oculus Rift®, Google Cardboard®, HTC Vive®, Samsung Gear VR®, Sony PlayStation VR®, and/or Microsoft HoloLens®.

The VR device 142 may be used to display the driving simulation. The 3-D and/or 360-degree-field-of-view display capabilities of the VR device 142 may advantageously provide an immersive and realistic driving simulation for the user. Additionally, the VR device 142 may be used to collect and record user performance data (e.g., the head movement of the user) for use in a driving performance assessment, as described below.

The physiological sensor 143 may be configured to detect and record data representative of one or more physiological characteristics of the user during the driving simulation. Such characteristics include, but are not limited to, the heart rate of the user, the breathing rate of the user, the body temperature of the user, the blood pressure of the user, or any suitable combination thereof. Such data may be used to evaluate, for example, the alertness, stress level, and/or temperament of the user during the simulation.

The MS device 144 may be configured to record (e.g., detect) data representative of one or more of the movement of the head of the user during the driving simulation, movement of one or more eyes of the user during the driving simulation, movement of one or more arms of the user during the driving simulation, movement of one or more hands of the user during the driving simulation, movement of a torso of the user during the driving simulation, or any combination thereof. In some embodiments, the MS device 144 may be configured to detect the user's hand position and hand movements, so that they can be re-created in the virtual reality driving simulation displayed by the VR device 142, thereby improving the immersive nature and realism of the simulation. Secondary tasks such as interacting with a cell phone, navigation device, or other in-vehicle infotainment systems may also be simulated inside the VR device 142 with this technique. The MS device 144 could be configured with various sensors for detecting movement including, but not limited to, a gyroscope, accelerometer, structured light system, or any combination thereof. In some embodiments, the MS device 144 may be built-into the VR device 142; whereas in other embodiments, the MS device 144 may be separate from the VR device 142. The MS device 144 may be configured to detect actions of the user (e.g., movement of the user's foot via pedals).

Each of the client devices 136-144 may interact with a data system 116 to receive, via the computer network 106, simulation data and/or server data from a server 120, and may display the simulation data and/or server data via a client application and/or an Internet browser. For example, the desktop computer 138 may display a simulator menu and/or a performance assessment on a client application and/or through a web page to a user, may receive an input parameter from the user, and/or may interact with the data system 116. It will be appreciated that although only one server 120 is depicted in FIG. 1, multiple servers may be provided for the purpose of distributing server load, serving different web pages, etc. These multiple servers may include a web server, an entity-specific server (e.g., an Apple® server, a server operated by an insurance company, etc.), a server that is disposed in a retail and/or proprietary network, etc. In some embodiments, the server 120 may provide the functionalities of a cloud-based computing system.

The simulator module 112 may retrieve data from the databases 118*a* and/or 118*b*. The databases 118*a* and/or 118*b* may be maintained by, for example, an insurance provider. In some embodiments, the database 118*a* may store data and/or instructions for rendering the driving simulation (e.g., graphics, teaching instructions, audio files, menus, etc.) and the database 118*b* may store information relating to a driver profile including, but not limited to, driver identification information (e.g., a name, address, social security number, etc.), past and/or present insurance policies, incident reports, moving violations, etc. The simulator module 112 may also be implemented to receive data through one or more of the client devices 136-144 to be stored in databases 118*a* and/or 118*b*.

The server 120 may send and/or receive information from the databases 118*a* and/or 118*b*, such as computer-readable instructions and/or data associated with applications (e.g., the simulator module 112) executing on one or more of the client devices 136-144. The applications executing within the system 100 may include cloud-based applications, web-based interfaces to the data system 116, software applications executing on the clients, and/or applications including instructions that are executed and/or stored within any component of the system 100. The applications, GUI 110, browser, and/or simulator module 112 may be stored in various locations including separate repositories and/or physical locations.

In some embodiments, computer-readable instructions 122 may be stored within one or more memories 124 (e.g., a RAM, a non-volatile memory such as a hard disk, a flash memory, a removable memory, a non-removable memory, etc.) of the server 120 and/or executed using one or more processors 126 included in the server 120. The computer-executable instructions 122 may be representative of the simulator module 112 and/or send instructions to one or more of the clients 136-144 to implement the GUI 110 for the simulator module 112 using a web browser application of a client. In some embodiments, the browser application, the GUI 110, the simulator module 112, and/or elements of the data system 116 may be implemented at least partially on the server 120 and/or clients 136-144. The data system 116 and/or processor 126 may execute the computer-readable instructions 122 to display the GUI 110 including the data 118*a* and/or 118*b* within a display of the clients 136-144 and/or server 120 (not shown). For simplicity, FIG. 1 illustrates the display of the GUI 110 via the computer 138, although this is not intended to limit the number and/or display locations of the GUI 110.

In some embodiments, the simulator module 112 may be a client application that may be implemented as a series of machine-readable instructions for performing the various tasks associated with implementing the driving simulation, as well as receiving information, displaying information, and/or transmitting information between devices 136-144 and/or the server 120.

In some embodiments, the simulator module 112 may be implemented as a stand-alone system and/or as a system wherein the front-end components 136-144 communicate with back-end components 104 as described herein. Additionally, the simulator module 112 may include computer-readable instructions for implementing a virtual reality driving simulation.

The simulator module 112 may include a native web browser, such as Apple's Safari®, Google Android™ mobile web browser, Microsoft Internet Explorer® for Mobile, Opera Mobile™, that may be implemented as a series of computer-readable instructions for receiving, interpreting, and/or displaying web page information from the server 120 and/or other back-end components 104 while also receiving inputs from the user. The simulator module 112 may include an embedded web browser that may be implemented as a series of computer-readable instructions for receiving, interpreting, and/or displaying web page information from the servers 120 and/or other back-end components 104 within client devices 136-144.

In some embodiments, the simulator module 112 may be an application that is installed on the client devices 136-144. For example, the simulator module 112 may be downloaded and/or installed to the computer 138 by the user. Additionally or alternatively, the simulator module 112 may include computer-readable instructions for implementing a user interface to allow a user to input commands and/or respond to prompts. For example, the simulator module 112 may allow a user to select clickable icons (e.g., through a touch screen interface) and/or enter information through text inputs. The simulator module 112 may further execute a particular simulation (based on the received inputs) via the computer 138 and further via the HTU 136, the VR device 142, the steering wheel 140, the pedals 141, the physiological sensor 143, and/or the MS device 144.

II. Example Methods for Situational Awareness Recovery Driver Training

A. Simulation Creation and Assessment

Figure 2:
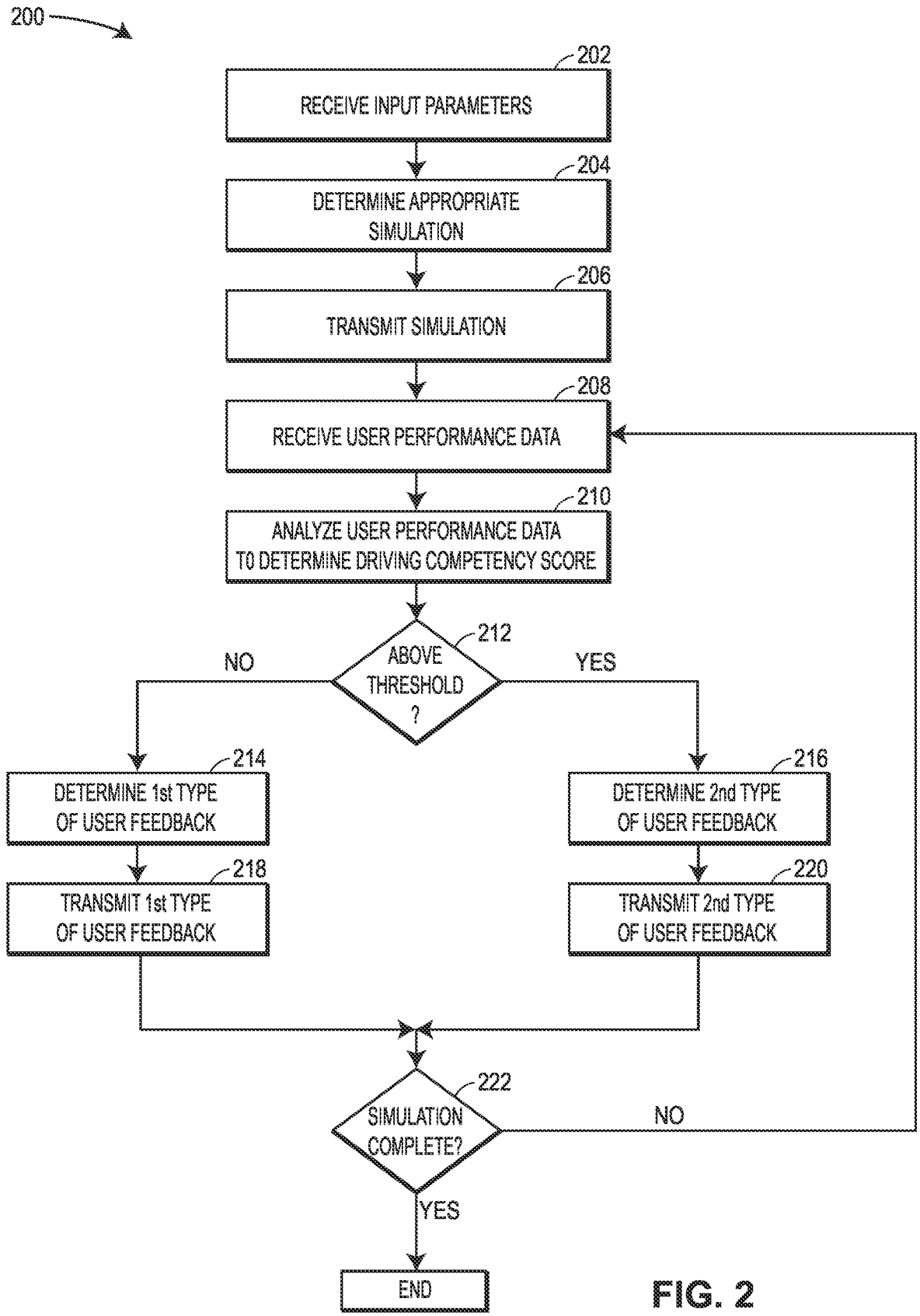
FIG. 2 is a flowchart depicting one embodiment of a method for creating a virtual reality driving simulation and assessing user performance in accordance with principles of the present disclosure.

FIG. 2 is a flow diagram of an example method 200 for creating a virtual reality driving simulation and assessing the performance of a user's situational awareness recovery in the virtual reality driving simulation for an autonomous vehicle. It should be appreciated that herein, the term "situational awareness" and "situation awareness" may be used interchangeably. In some embodiments, the example method 200 may be implemented, in whole or in part, by the server 120. In other embodiments, the example method 200 may be implemented by the server 120 in combination with one or more of the client devices 136-144, or by one or more of the client devices 136-144 alone. In some embodiments, the method 200 may be implemented, in whole or in part, by an application stored in a memory of a mobile telephone (e.g., a smartphone) which is configured as the computer 138 or tablet which is configured as the computer 138. Furthermore, in some embodiments, the method 200 may be saved, in whole or in part, as a set of computer-readable instructions, routines, programs, modules, and/or applications on one or more memories included in the server 120 and/or client devices 136-144.

The method 200 may begin with one or more components of the system 100 receiving input parameters (see FIG. 2 at block 202). In some embodiments, this step may involve the simulator module 112 causing the computer 138 to receive input parameters from the user. The input parameters may also be inputted by the user through one or more of the other client devices 136 and 140-144. In some embodiments, the input parameters may transmitted over the computer network 106 and received by the server 120.

In general, the input parameters may correspond to one or more features to be rendered during the virtual reality driving simulation. For example, the input parameters may include, but are not limited to, one or more of the following:

(1) Type of autonomous vehicle (e.g., a car, truck, motorcycle, plane, boat, watercraft, heavy machinery, forklift, etc.) to be rendered in the virtual reality driving simulation, including the make, year, and/or model of the vehicle;

(2) Type of road (e.g., city, rural, suburban, mountainous, off-road, etc.), including existing real-world streets or fictional computer-generated roads;

(3) Type of driving conditions or weather (e.g., nighttime, daytime, sunny, raining, snowing, sleeting, etc.)

(4) Type of driving obstacles or hazards (e.g., stop sign, vehicle in blind spot, lane departure of another vehicle, another vehicle running red light, etc.);

(5) User identification information (e.g., name, ID, password, age, gender, height, etc.);

(6) Type of driving-related rules and/or skills to be learned (e.g., situational awareness recovery, etc.); and (7) Degree of difficulty of the virtual reality driving simulation (e.g., beginner, novice, expert, etc.).

In some embodiments, the input parameters may be used to correspond a user with a driver profile stored, for example, in the database 118b. As described below in more detail, a driving competency score assessed from a user's performance during the virtual reality situational awareness recovery simulation can be stored in the driver profile and used to make determinations corresponding to the user.

After the one or more input parameters have been received, the method 200 may involve determining a virtual reality driving simulation based on the one or more input parameters (see FIG. 2 at block 204). In some embodiments, the simulator module 112 may analyze the received input parameters and determine an appropriate virtual reality driving simulation. In some embodiments, the determination of the appropriate virtual reality driving simulation may be based solely on the input parameters; whereas in other embodiments, the determination of the virtual reality driving simulation may be based on the input parameters and other factors. For example, the simulator module 112 may automatically determine aspects of the virtual reality driving simulation that were not specified by input parameters provided by the user, such as the length of the virtual reality driving simulation. Furthermore, proprietary techniques can be used for determining the appropriate virtual reality driving simulation, including, for example, State Farm's Engaged Driver Training System, State Farm Road Trips, and State Farm Road Aware.

In some embodiments, the virtual reality driving simulation determined to be appropriate may include both: (i) an autonomous vehicle having multiple levels of vehicle control, including a first level of vehicle control requiring an automated driving system of the autonomous vehicle to monitor the driving environment and control the autonomous vehicle, and a second level of vehicle control requiring a human driver of the autonomous vehicle to monitor the driving environment and control the autonomous vehicle, to be rendered in virtual reality, for executing a transition from the first level of vehicle control to the second level of vehicle control, and (ii) a driving scenario, to be rendered in virtual reality, for the user to practice situational awareness recovery in response to the transition. As described in more detail below, when the virtual reality driving simulation is rendered by the VR device 142, the driving scenario may be rendered in the same general environment (i.e., a virtual reality environment) as the autonomous car in both the first level of vehicle control and in the second level of vehicle control, which, in some cases, may be pedagogically more effective than conventional driver training in which the student learns driving-related rules and/or skills in a classroom environment and subsequently practice these rules and/or skills in a different environment.

In general, the virtual reality driving scenario renders the autonomous vehicle in two or more different levels of vehicle control, with one level requiring the simulated autonomous vehicle to monitor the driving environment and control the vehicle, and a second level requiring the user to monitor the driving environment and control the vehicle. In some embodiments, the SAE International definitions for level of automation in autonomous vehicles may be utilized to define the different levels in the virtual reality driving scenario. The SAE International definitions are provided as two distinct responsibilities for dynamic driving tasks (human driver monitors the driving environment and the automated driving system monitors the driving environment), where:

"System" refers to the driver assistance system of the autonomous vehicle.

"Dynamic driving task" refers to operational (steering, braking, accelerating, monitoring the vehicle and roadway) and tactical (responding to events, determining when to change lanes, turn, use signals, etc.) aspects of the driving task, but not the strategic (determining destinations and waypoints) aspect of the driving task.

"Driving mode" refers to a type of driving scenario with characteristic dynamic driving task requirements (e.g., expressway merging, high speed cruising, low speed traffic jam, closed-campus operations, etc.).

"Request to intervene" refers to a notification by the automated driving system to a human driver that s/he should promptly begin or resume performance of the dynamic driving task.

Human Driver Monitors Driving Environment

Level 0: No Automation—the full-time performance by the human driver of all aspects of the dynamic driving task, even when enhanced by warning or intervention systems. Steering and acceleration/deceleration are executed by the human driver. Monitoring of the driving environment is executed by the human driver. Fallback performance of dynamic driving tasks is executed by the human driver.

Level 1: Driver Assistance—the driving mode-specific execution by a driver assistance system of either steering or acceleration/deceleration using information about the driving environment and with the expectation that the human driver perform all remaining aspects of the dynamic driving task. Steering and acceleration/deceleration are executed by the human driver and system. Monitoring of the driving environment is executed by the human driver. Fallback performance of dynamic driving tasks is executed by the human driver. There is some system capability (driving modes).

Level 2: Partial Automation—the driving mode-specific execution by one or more driver assistance systems of both steering and acceleration/deceleration using information about the driving environment and with the expectation that the human driver perform all remaining aspects of the dynamic driving task. Steering and acceleration/deceleration are executed by the system. Monitoring of the driving environment is executed by the human driver. Fallback performance of dynamic driving tasks is executed by the human driver. There is some system capability (driving modes).

Automated Driving System Monitors Driving Environment

Level 3: Conditional Automation—the driving mode-specific performance by an automated driving system of all aspects of the dynamic driving task with the expectation that the human driver will respond appropriately to a request to intervene. Steering and acceleration/deceleration are executed by the system. Monitoring of the driving environment is executed by the system. Fallback performance of dynamic driving tasks is executed by the human driver. There is some system capability (driving modes).

Level 4: High Automation—the driving mode-specific performance by an automated driving system of all aspects of the dynamic driving task, even if a human driver does not respond appropriately to a request to intervene. Steering and acceleration/deceleration are executed by the system. Monitoring of the driving environment is executed by the system. Fallback performance of dynamic driving tasks is executed by the system. There is some system capability (driving modes).

Level 5: Full Automation—the full-time performance by an automated driving system of all aspects of the dynamic driving task under all roadway and environmental conditions that can be managed by a human driver. Steering and acceleration/deceleration are executed by the system. Monitoring of the driving environment is executed by the system. Fallback performance of dynamic driving tasks is executed by the system. There is complete system capability (driving modes).

In one embodiment, the transition between the first and second levels refers to a transition between Level 3 and Level 2, though in other embodiments, the transition is between Level 3 (or higher) and Level 2 (or lower). In either case, a distinction between the levels is that in one level the automated driving system performs the entire dynamic driving task, and in another level the human driver performs at least part of the dynamic driving task. Thus, any transition between levels during the virtual reality driving simulation requires the user to take over the operational (steering, braking, accelerating, monitoring the vehicle and roadway) and tactical (responding to events, determining when to change lanes, turn, use signals, etc.) aspects of the driving scenario. Typically, such a transition is accompanied by a request to intervene from the autonomous vehicle to the driver, which may take the form of an audio cue, visual cue and/or haptic cue. In some embodiments, multimedia learning theory may be employed, which is the idea that different sensory channels (e.g., sight, sound, touch, etc.) are used to convey information than the sensory channel being taught, so as to not "overload" the sensory channel being taught. Thus, for example, where the virtual reality driving simulation is teaching situational awareness recovery, which primarily relies on sight, the cue for the transition between level of vehicle control should be something other than a visual cue, such as an audio and/or haptic cue. As such, sound and touch are used to drive learning, whereas sight is used to absorb the information around the driver.

As demonstrated above, there are a number of aspects that the driver must take over when the autonomous vehicle transitions from a first level of vehicle control requiring an automated driving system of the autonomous vehicle to monitor the driving environment (e.g., responding to events, determining when to change lanes, turn, use signals, etc.) and control the autonomous vehicle (e.g., steering, braking, accelerating, monitoring the vehicle and roadway) to a second level of vehicle control requiring the human driver to monitor the driving environment and control the autonomous vehicle. Thus, the driving skill or task of situational awareness recovery is considered complex, as the user must learn to recognize everything going on in the driving environment, and respond with the appropriate operational control of the vehicle and tactical aspects. As such, situational awareness recovery may be simulated in parts (e.g., one part steering, one part braking, one part responding to events, etc.). Accordingly, in some embodiments, the virtual reality driving simulation may utilize a series of learning modules, where individual learning modules focus on different aspects of situational awareness recovery, other learning modules combine different aspects and a further module combines all aspects, so that gradually a user learns how to recover situational awareness when an autonomous vehicle transitions from autonomous driving to manual driving.

For example, a first learning module may involve a driving scenario where the autonomous vehicle is driving off course (e.g., move from one driving lane to another) as a result of the transition from autonomous driving control to manual driving control in order to test and teach the user to respond with appropriate steering, and the virtual reality driving simulation automates other aspects such as braking, accelerating, monitoring the vehicle and roadway, etc. Another learning module may involve a driving scenario where the autonomous vehicle comes to a sudden stop as a results of the transition in order to test and teach the user to respond with appropriate speed and/or braking control, and the virtual reality driving simulation automates the other aspects such as steering, monitoring the vehicle and roadway, etc. As a user successfully completes each learning module, the virtual reality driving simulation may move to the next learning module, including learning modules that combine driving off course and suddenly stopping. Although the same general environment (i.e., a virtual reality environment) is used for the both levels of the autonomous vehicle and the driving scenario in the present disclosure, the particulars of the driving scenario (e.g., traffic conditions, road conditions, vehicle type, etc.) may be varied relative to the different learning modules.

Once an appropriate virtual reality driving simulation has been determined, the simulator module 112 may transmit the virtual reality driving simulation via the computer network 106 for execution by one or more of the client devices 136-144 (see FIG. 2 at block 206). In some embodiments, the simulator module 112 may transmit the virtual reality driving simulation to the computer 138, which in turn may cause one or more of the other client devices 136 and 140-144 to render the virtual reality driving simulation and/or record user performance data, as discussed below in connection with FIG. 3.

Subsequently, after the virtual reality driving simulation has been rendered, the simulator module 112 may receive the user performance data, via the computer network 106 (see FIG. 2 at block 208). As described below in more detail, the user performance data may be recorded via one or more of the client devices 136-144.

Next, the simulator module 112 may analyze the received user performance data to determine a driving competency score (see FIG. 2 at block 210). In some embodiments, the driving competency score may measure user reaction to the transition between autonomous driving and manual driving during the driving scenario of the virtual reality driving simulation. In this way, the driving competency score may reflect how well the user recovered situational awareness so as to quickly gain awareness of the driving environment and respond to the transition. In order to determine the driving competency score, the simulator module 112 may compare the user performance data with data stored in the database 118a and/or the database 118b, or data stored elsewhere. For example, the data stored in the database 118a and/or the database 118b may be based on tests of individuals to monitor their movements and classify driving behavior. That is, different individuals may response with different movements, such as different degrees of head displacement, which may be recorded by having test subjects move their head left to right. One individual may only slightly move his/her head, whereas another may move his/her head to a greater degree. By testing the head displacement of various individuals, the data may be stored to establish the minimum displacement as the threshold for other drivers using the virtual reality simulation. As such, user performance data on a driver's head displacement in response to an event in the driving scenario may be compared to the minimum recorded head displacement to determine if the driver properly responded to the event or not. Of course, head displacement is but one example, and similar thresholds may be established for a variety of movements and reactions of the user as mentioned below.

In some embodiments, the simulator module 112 may implement various algorithms to analyze the user performance data to determine the driving competency score for situational awareness recovery. For example, the simulator module 112 may receive a video of the user recorded during the driving scenario portion of the virtual reality driving simulation. The module 112 may then implement a video tracking algorithm to analyze various body movements of the user (e.g., head movements, arm movements, leg movements, torso movements, hand movements, foot movements, etc.) during the virtual reality driving simulation to determine if the user reacted appropriately to the virtual reality driving simulation. Based on this analysis, the simulator module 112 may then determine an appropriate driving competency score.

In some embodiments, the simulator module 112 may receive user performance data based on the user's operation of controls (e.g., the user's operation of the steering wheel 140 and/or pedals 141) during the driving scenario portion of virtual reality driving simulation. The simulator module 112 may then implement an algorithm to analyze whether the user applied, for example, appropriate steering wheel movement, appropriate turning speed, acceleration, and/or deceleration during the driving scenario portion of the virtual reality driving simulation. The simulator module 112 may then determine a driving competency score based on this analysis.

In some embodiments, the simulator module 112 may analyze user performance data recorded by the VR device 142. For example, the VR device 142 may detect and record head and/or eye movements of the user. The simulator module 112 can determine if a user reacted appropriately throughout the driving scenario portion of the virtual reality driving simulation based on the user performance data recorded by the VR device 142. For example, the simulator module 112 may determine that the user's head was turned away from the road for an excessive amount of time at various times during the virtual reality driving simulation, and/or that the user was not looking at a particular road sign, roadway object and/or road hazard at a particular time during the virtual reality driving simulation.

Using one or more of the above analyses, the simulator module 112 may determine a driving competency score reflecting the user's recovery of situational awareness during the driving scenario. In general, a user's situational awareness recovery should be 2 seconds or less to safely maintain control of the vehicle. That is, when an autonomous vehicle notifies the driver that it is transitioning from an autonomous level of vehicle control to a manual level of vehicle control, the driver should respond within 2 seconds or less to monitor the driving environment and control the vehicle. This response may be based on various factors, such as head and arm movement from the video tracking algorithm to measure the user's reflex in response to the transition, deceleration and appropriate steering wheel movement from the user's operation of controls to measure the user's response to a roadway object during the transition, and eye movement from the VR device to measure the user's attention to the surrounding driving environment. In some embodiments, the user's reflex, response to roadway object and attention to the driving environment must be at or below established thresholds, such as degree of movement and speed, in order for the user to recover situational awareness. As mentioned above, individual learning modules may be utilized to focus on different aspects of situational awareness recovery. Accordingly, one learning module may focus on a user's reflex, whereas another learning module focuses on a user's response to a roadway object and yet another learning module focuses on a user's attention to the driving environment, in which case only the relevant factor(s) may be used to determine the driver competency score for each learning module. In other learning modules, combinations of different aspects of situational awareness recover may be tested (e.g., user's reflex in combination with response to a roadway object), in which case the relevant factors for each are used in combination to determine the driver competency score. Eventually, it is expected that a learning module combining all aspects of situational awareness recovery will be used to test the user, in which case the driver competency score takes into account all relevant factors.

The driving competency score can take various forms. In some embodiments, the driving competency score can be a pass or fail grade. In other embodiments, the driving competency score can be a numbered grade, such as a score from 0-100. In further embodiments, the driving competency score can be a letter grade (e.g., a grade of A through F). In still further embodiments, the driving competency score may be a percentage based on the number of aspects of situational awareness recover the user performed correctly during the virtual reality driving simulation.

After the driving competency score has been determined, the method 200 may involve comparing the driving competency score with a predetermined threshold (see FIG. 2 at block 212). For example, in an embodiment where the driving competence score is a letter grade, the predetermined threshold may be a letter grade of "C". In response to a determination that the driving competency score is above or equal to the predetermined threshold, the simulator module 112 may determine a first type of user feedback (see FIG. 2 at block 214). In response to a determination that the driving competency score is below the predetermined threshold, the simulator module 112 may determine a second type of user feedback (see FIG. 2 at block 216). After the first or second feedback has been determined, it may be transmitted via the computer network 106 for execution by one or more of the client devices 136-144 (see FIG. 2 at blocks 218 and 220). In some embodiments, the simulator module 112 may transmit the first or second user feedback to the computer 138, which in turn may cause one or more of the client devices 136 and 140-144 to communicate the first or second user feedback to the user, as discussed below in connection with FIG. 3.

In some embodiments, the first type of user feedback may include positive reinforcement for the user including, for example, praise and/or a reward (e.g., the ability to upgrade the make or model of the vehicle rendered by the virtual reality driving simulation). Additionally, or alternatively, the first type of user feedback may include both: (i) a second learning module, and (ii) an updated driving scenario, to be rendered in virtual reality, for the user to practice the aspects of situational awareness recovery skill taught by the second learning module. Accordingly, in some embodiments, the simulator module 112 may automatically adapt the virtual reality driving simulation so that the user does not necessarily have to repeat a learning module for an aspect of situational awareness recovery for which the user has already become proficient. Accordingly, the user may proceed with learning and practicing different and/or higher-level situational awareness recovery skills.

In some embodiments, the second type of user feedback may notify the user of their inadequate driving competency score and/or provide encouragement and/or tips for improving their score. Additionally, or alternatively, the second type of user feedback may include an updated driving scenario, to be rendered in virtual reality, to elicit an emotional reaction from the user. For example, failure to adequately control the steering wheel after the transition from autonomous driving to manual driving may result in updating the driving scenario to include a crash into another vehicle, object or person. Similarly, failure to be aware of a roadway sign, such as a stop sign, may result in updating the driving scenario to include striking a pedestrian. Accordingly, the simulator module 112 may automatically adapt the virtual reality driving simulation to ensure that the user acquires proficiency with various aspects of situational awareness recovery.

Next, the method 200 may involve determining whether the virtual reality driving simulation is complete (see FIG. 2 at block 222). If not, the method 200 may return to block 208 shown in FIG. 2, such that the simulator module 112 may receive additional user performance data, via the computer network 106, related to the updated virtual reality driving simulation previously transmitted in the form of the first or second user feedback; and subsequently, the method 200 may repeat the steps represented by blocks 210-222 of FIG. 2.

B. Rendering a Simulation and Recording User Performance Data

Figure 3:
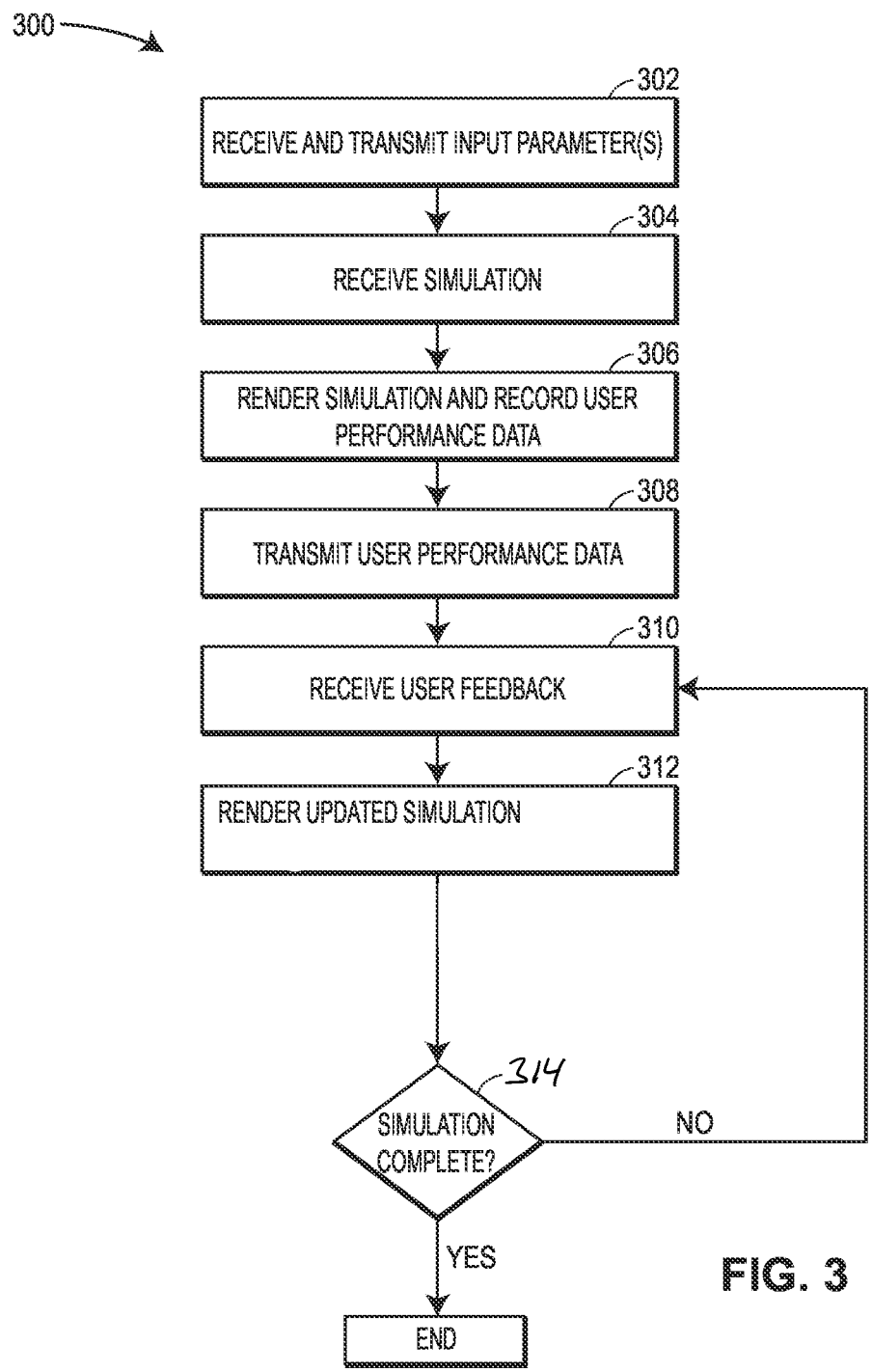
FIG. 3 is a flowchart depicting one embodiment of a method for rendering a virtual reality driving simulation and recording user performance data in accordance with principles of the present disclosure.

FIG. 3 is a flow diagram of an example method 300 for rendering a virtual reality driving simulation and recording user performance data. In some embodiments, the example method 300 may be implemented, in whole or in part, by one or more of the client devices 136-144. In some embodiments, the method 200 may be implemented, in whole or in part, by an application stored in a memory of a mobile telephone (e.g., a smartphone) which is configured as both the computer 138 and the VR device 142. Furthermore, in some embodiments, the method 300 may be saved, in whole or in part, as a set of computer-readable instructions, routines, programs, modules, and/or applications on one or more memories included in one or more of the client devices 136-144.

The method 300 may begin with one or more of the client devices 136-144 receiving one or more input parameters corresponding to one or more features to be rendered during the during the virtual reality driving simulation (see FIG. 3 at block 302). In some embodiments, the simulator module 112 may cause the computer 138 to receive the one or more input parameters from the user. After the one or more client devices 136-144 has received the one or more input parameters, the one or more input parameters may be transmitted, via the computer network 106, to the backend components 104. Examples of the input parameters are described above.

Subsequently, the computer 138 may receive, via the computer network 106, the virtual reality driving simulation (see FIG. 3 at block 304). The received virtual reality driving simulation may be the one transmitted by the backend components 104 at block 204 of the method 200 shown in FIG. 2.

Subsequently, the computer 138 may execute the virtual reality driving simulation such that the virtual reality driving simulation is rendered by one or more of the client devices 136-144 (see FIG. 3 at block 306). In some embodiments, rendering the virtual reality driving simulation may include, at least, displaying images on the stereoscopic display of the VR device 142 and/or emitting audio (e.g., spatial audio) through one or more speakers incorporated into the VR device 142. The user may manipulate the steering wheel 140, pedals 141, and/or other controls when practicing the driving-related rules and/or skills during the driving scenario portion of the virtual reality driving simulation.

Additionally, the driving scenario may include an audio and/or haptic cue identifying (e.g., highlighting or emphasizing) when the autonomous vehicle transitions from a first level of vehicle control requiring the automated driving system of the autonomous vehicle to monitor the driving environment and control the autonomous vehicle to a second level of vehicle control requiring the user of the autonomous vehicle to monitor the driving environment and control the autonomous vehicle. In an embodiment, the audio and/or haptic cue is an exogenous cue which may simulate the type of audio and/or haptic cue in an actual autonomous vehicle.

While the virtual reality driving simulation is being rendered, one or more of the client devices 136-144 may simultaneously record user performance data. In some embodiments, the computer 138 may cause the VR device 142 to render the virtual reality driving simulation and also simultaneously cause the VR device 142 (e.g., via the MS device 144) to record user performance data representative of movement of the user's head and/or eyes during driving scenario of the virtual reality driving simulation. Additionally, or alternatively, the computer 138 may cause the steering wheel 140 to record user performance data representative of, for example, the user's control and turning speed, and cause the pedals 141 to record user performance data representative of, for example, the user's acceleration and/or deceleration, during the driving scenario of the virtual reality driving simulation. Additionally, or alternatively, the computer 138 may cause the HTU 136 to record user performance data representative of, for example, movement of one or more of the user's head, arms, hands, torso, or any other portion of the user's body during at least the practice driving scenario portion of the virtual reality driving simulation. Additionally, or alternatively, the computer 138 may cause the physiological sensor 143 to record user performance data representative of, for example, the heart rate of the user, the breathing rate of the user, the body temperature of the user, and/or the blood pressure of the user during at least the practice driving scenario portion of the virtual reality driving simulation.

It is noted that although the system 100 of the present embodiment comprises the client devices 136-144, the system 100 may include other client devices to render the simulation and/or record user performance data. For example the computer 138 may also implement a keyboard, monitor, mouse, voice recorder, etc. to render the simulation and/or record user performance data, or even may even utilize another computer to improve performance.

Once the virtual reality drive simulation is complete, the user performance data may be transmitted, via the computer network 106, to the backend components 104 for analysis (see FIG. 3 at block 308). The recorded user performance data may then be analyzed data to determine a driving competency score, as described above with respect to block 210 of FIG. 2. In some embodiments, this analysis may be performed by the computer 138 and/or one or more of the other client devices 136 and 140-144. In some embodiments, the user performance data representative of the movement of the user's head and/or eyes may be analyzed to determine if the user was looking at an appropriate object (e.g., the stop sign 506 shown in FIG. 5) at the time of the transition, or immediately thereafter, during the driving scenario. If the analysis of the user performance data reveals that the user did not move their eyes and/or head to look at this object at the appropriate moment in time during the driving scenario, and/or that the user did not move their eyes and/or head in a correct scanning pattern, then the user may receive a lower driving competency score (e.g., lower than the predetermined threshold).

Subsequently, one or more of the client devices 136-144 may receive, via the computer network 106, user feedback based on the driving competency score (see FIG. 3 at block 310). Examples of the types of user feedback that may be received by the one or more client devices 136-144 are described above in connection with blocks 216-220 of FIG. 2.

If the driving competency score is above or equal to a predetermined threshold, the first type of user feedback may be provided. In some embodiments, the first type of user feedback may include positive reinforcement for the user including, for example, praise and/or a reward (e.g., the ability to upgrade the make or model of the vehicle being rendered by the virtual reality driving simulation). Additionally, or alternatively, the first type of user feedback may include an updated virtual reality driving simulation including, at least, displaying images on the stereoscopic display of the VR device 142 and/or emitting audio through one or more speakers incorporated into the VR device 142. In some embodiments, the images and/or audio of the updated virtual reality driving simulation may include a further learning modules that includes a transition between autonomous driving and manual driving and a driving scenario that tests a user for a different aspect of situational awareness recovery. The updated virtual reality driving simulation may be adapted to reflect the user's proficiency with the initial set of situational awareness recovery aspect(s).

If the driving competency score is below a predetermined threshold, the second type of user feedback may be provided. In some embodiments, the second type of user feedback may notify the user of their inadequate driving competency score and/or provide encouragement and/or tips for improving their score. Additionally, or alternatively, the second type of user feedback may include an updated virtual reality driving simulation including, at least, displaying images on the stereoscopic display of the VR device 142 and/or emitting audio through one or more speakers incorporated into the VR device 142 that reflect a consequence of the low competency. In some embodiments, the images and/or audio of the updated virtual reality driving simulation may include an updated driving scenario that elicits an emotional response in the user, such an a vehicular crash.

Finally, the method 300 may involve determining whether any and all virtual reality driving simulations are complete (see FIG. 3 at block 314). If not, the method 300 may return to block 310 shown in FIG. 3, such that the one or more client devices 136-144 may receive additional feedback, via the computer network 106, and subsequently may repeat the steps represented by blocks 310-316 of FIG. 3.

III. Example Displays for Situational Awareness Recovery Driving Simulation

Figure 4:
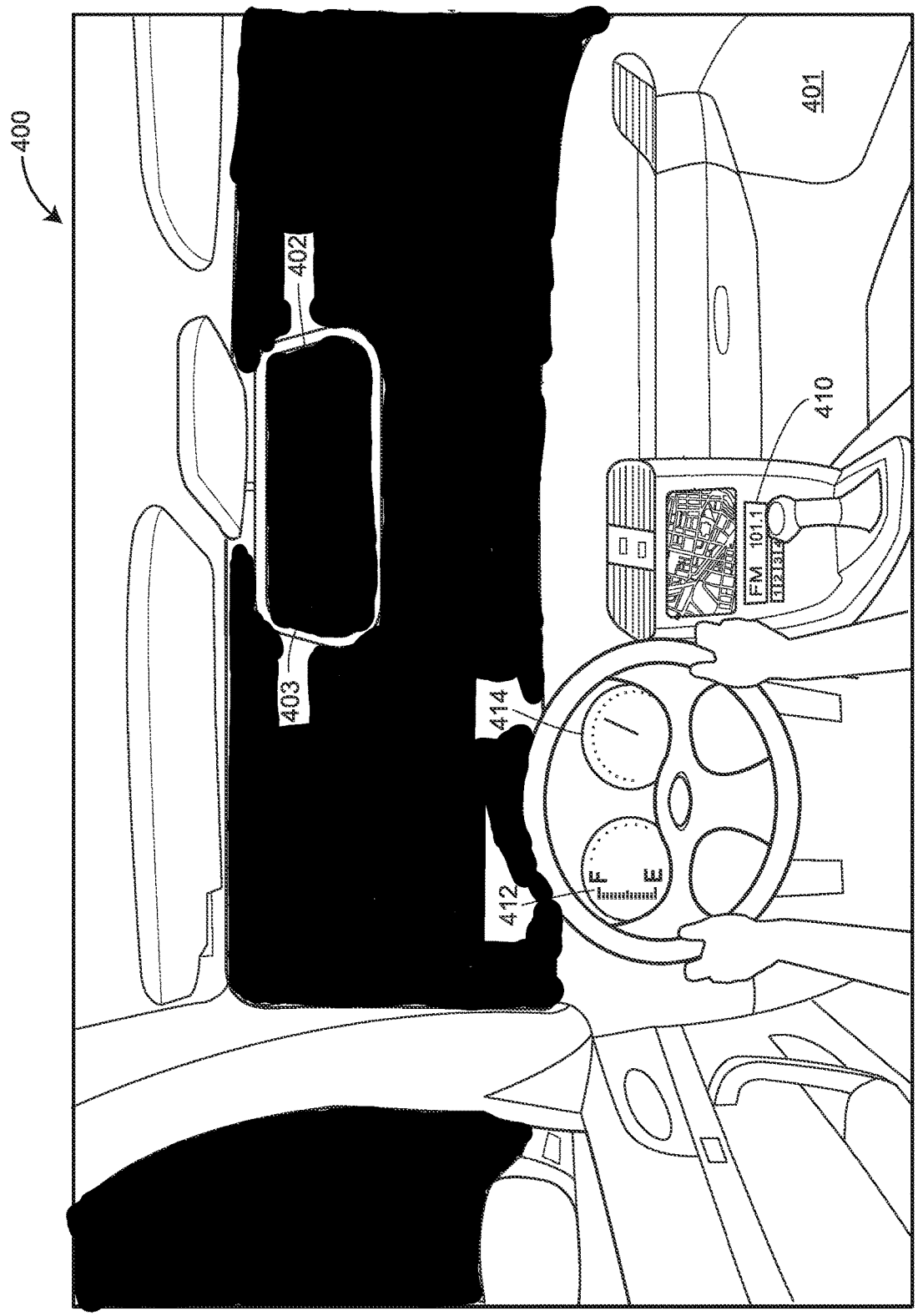
FIG. 4 is an illustration of one embodiment of a display rendered to a user during a virtual reality driving simulation in accordance with principles of the present disclosure.
Figure 5:
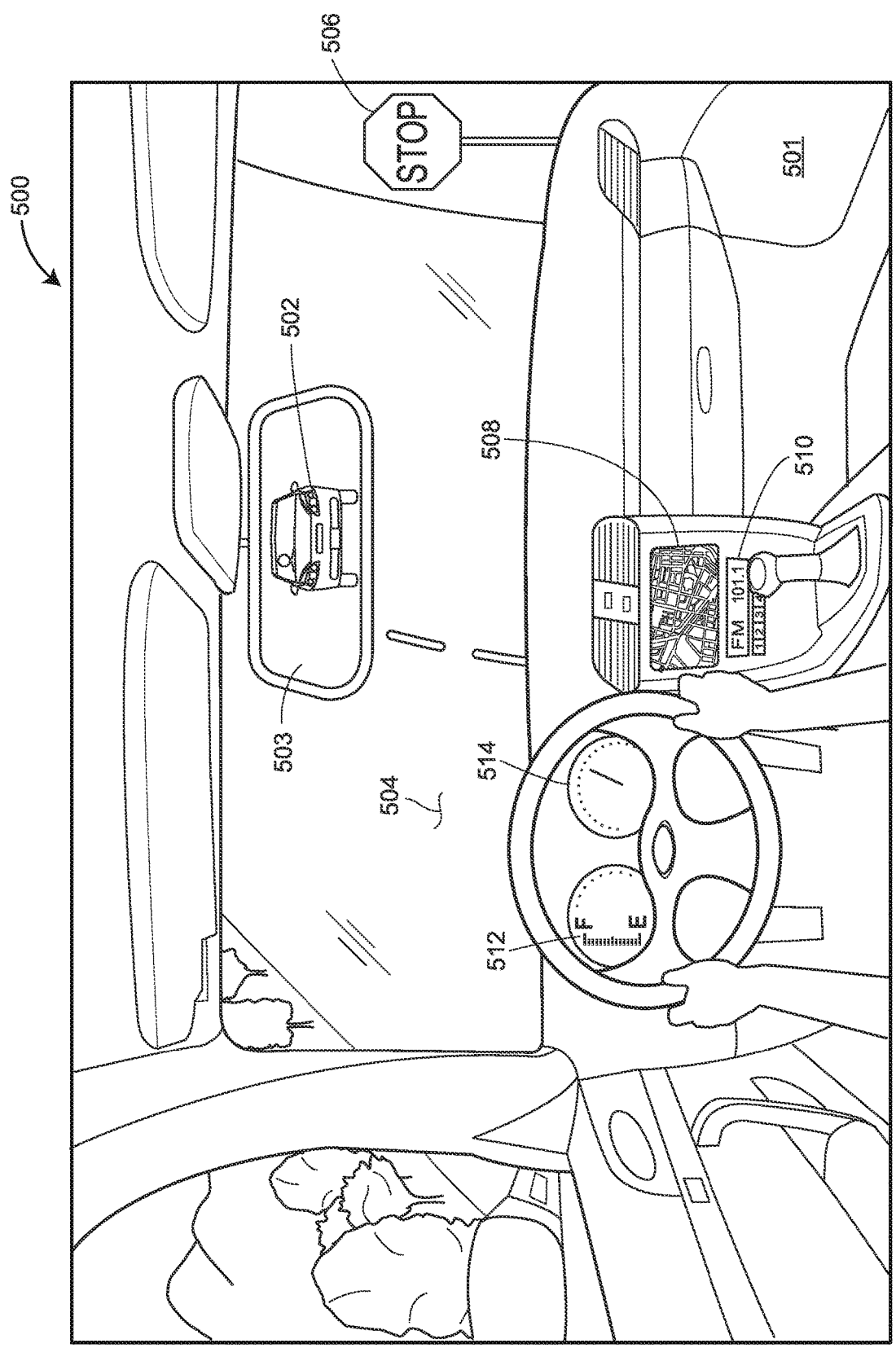
FIG. 5 is an illustration of one embodiment of another display rendered to a user during a virtual reality driving simulation in accordance with principles of the present disclosure.

FIGS. 4 and 5 are exemplary displays for teaching/testing situational awareness recovery. In the embodiment shown in conjunction with FIGS. 4 and 5, the roadway is obstructed (which may include blocking the roadway scene and/or not rendering the roadway scene) (see FIG. 4), and after a period of time the obstruction is removed to reveal/render a roadway scene (see FIG. 5). The period of time may be random, so as to not be predicted by the user. The displays 400, 500 are for a driving scenario included as part of a virtual reality driving simulation, including, for example, the virtual reality driving simulations described above. In some embodiments, the displays 400, 500 may be rendered in virtual reality by the VR device 142 worn by the user during the virtual reality driving simulation. In other embodiments, the displays 400, 500 may be rendered on a monitor of the computer 138, for example.

Referring to FIG. 4, although illustrated as a stationary image, the display 400 may be part of a sequence of images representing a 360 degree, three-dimensional interactive virtual environment for the user. The VR device 142 may be configured to make the display 400 interactive for the user. For example, if the user wearing the VR device 142 were to turn to their head to the left, the display 400 would change to show the elements to the left of the display 400 shown in FIG. 4. In this example, the driver in the display 400 would turn to the left and see the interior of the autonomous vehicle as well as certain exterior elements of the vehicle (e.g., a side view mirror, the hood, etc.) that a driver would typically see from the driver's seat of a vehicle. Accordingly, an immersive experience that realistically simulates an autonomous vehicle may be provided by the VR device 142.

The display 400 may include one or more features corresponding to the one or more input parameters. For example, the display 400 may include an autonomous vehicle 401 corresponding to the type of vehicle specified by the one or more input parameters. The autonomous vehicle 401 may include a car with a steering wheel on the left hand side, a car with the steering wheel on the right hand side, a truck, a motorcycle, plane, boat, watercraft, heavy machinery, forklift, etc. The autonomous vehicle 401 may also correspond to the make, year, and/or model of the autonomous vehicle owned by the user in real-life.

The variability of the autonomous vehicle 401 may provide the virtual reality driving simulation with added realism. For example, if the selected autonomous vehicle is a sports car, the simulation may have the look and feel of a sports car. Similarly, if the selected autonomous vehicle 401 is a truck, motorcycle, van, etc. the simulation may be adjusted accordingly. The simulator module 112 may achieve this by choosing displays and controls based on the selected autonomous vehicle 401. For example, the simulation module 112 may generate a display for the steering wheel, radio, mirrors, speedometer, fuel meter, etc. according to the design layout and/or specifications of an autonomous vehicle 401 selected by the one or more input parameters. The above exemplary display elements are intended as an example and are not intended to limit the scope of the elements that can be displayed according to a vehicle's specifications.

In some embodiments, the simulator module 112 may adjust various control elements of the virtual reality driving simulation according to the selected autonomous vehicle 401. For example, the simulator module 112 may adjust the vehicle acceleration, turning radius, braking speed, visibility, height, audio/haptic cues, etc. of the simulation based on the autonomous vehicle 401. Accordingly, this may provide added realism by adjusting the control of the vehicle according to the real-life control and/or handling of the vehicle. The above exemplary control elements are intended as an example and are not intended to limit the scope of the control elements that can be adjusted according to the vehicle's specifications.

The display 400 may also include interactive rearview mirrors 403. The rearview mirrors 403 may be adjusted by the driver during the simulation. Although only one rearview mirror 403 is included in the display 400, the virtual reality driving simulation may include multiple rearview mirrors 403 and/or side view mirrors. Additionally, the display 400 may include a simulated rearview camera screen as part of the display 400. The display 400 may also include an interactive radio 410, a fuel indicator 412, and/or a speedometer 414.

Turning to FIG. 5, although illustrated as a stationary image, the display 500 may likewise be part of a sequence of images representing a 360 degree, three-dimensional interactive virtual environment for the user. In one embodiment, the displays 400, 500 are parts of the same sequence of images, where the display 400 is shown to obstruct a roadway scene, and subsequently, the display 500 is shown to reveal the roadway scene. Elements of the display 500 which are the same as the display 400 are designated by the same reference numeral, incremented by 100. A description of many of these elements is abbreviated or even eliminated in the interest of brevity.

The VR device 142 may be configured to make the display 500 interactive for the user. For example, if the user wearing the VR device 142 were to turn to their head to the left, the display 500 would change to show the elements to the left of the display 500 shown in FIG. 5. In this example, the driver in the display 500 would turn to the left and see not only the interior of the autonomous vehicle as in FIG. 1, but also see outside the driver-side window (including, for example, an interactive side view mirror). Accordingly, an immersive experience that realistically simulates real-life driving may be provided by the VR device 142. Furthermore, the immersive experience provided by the VR device 142 can make the driving scenario more effective by successfully simulating dangerous conditions such as fog, rain, snow, high speeds, and near collisions, etc., all without putting the driver in real danger.

In general, the display 500 shown in FIG. 5 is intended to replicate real-life autonomous driving scenario for the user to practice situational awareness recovery and aspects thereof. In one embodiment where the display 500 is shown in sequence with the display 400, the sequence is intended for the user to practice particular driving scenarios in which the autonomous vehicle transitions from autonomous driving to manual driving. For example, the user is continuously presented with an obstructed roadway as in the display 400, and then, after a period of time, the user is presented with a roadway scene as in the display 500 replicating a real-life driving scenario when the autonomous vehicle 501 transitions from autonomous driving to manual driving (e.g., stop sign, highway driving, lane drifting or veering off course, sudden acceleration, deceleration or stops, object avoidance, etc.). Each scenario may be presented as different learning modules or any combination thereof, as described above.

In other embodiments, the display 500 is intended for the user to practice vigilance, which may likewise be provided in a learning module. For example, the display 500 may depict a roadway scene of continuous driving for a prolonged period of time (e.g., 10 minutes) without any incident, such as an obstruction, turn, other vehicle, etc. In one respect, the prolonged period of driving may be considered boring to the user, though at some point generally unknown to the user, the autonomous vehicle 501 transitions from autonomous driving to manual driving, and simulates an errant behavior, such as a sudden stop, deceleration, driving off course, etc. This is intended to replicate real-life autonomous driving, where the CV of an autonomous car may suddenly fail due to, for example, rain, snow, glare, low confidence level in object identification, etc. A real-life behavior of the autonomous vehicle in such situations may include deceleration, stopping or driving off course as a programmed response to the CV failure. However, such programmed behavior may represent a danger to the driver, passengers or other people and objects in the driving environment. Accordingly, a sudden errant behavior may be introduced into the driving scenario, to teach the user to maintain vigilance even during autonomous driving.

In still other embodiments, the display 500 may be intended for the user to practice different aspects of retaking control of the vehicle, as part of the situational awareness recovery. For example, a learning module may focus on retaking manual control of the steering, whereas the simulation maintains speed control. Another learning module may focus on retaking manual control of the speed, whereas the simulation maintains steering control. A further learning module may then have the user practice retaking both steering and speed control in combination.

In each case, the manner in which the user reacts to the driving scenario may be recorded as part of the user performance data, as described previously. The user performance data subsequently may be analyzed to determine a driving competency score and appropriate feedback may be provided to the user, as described above.

In some embodiments, additional vehicles 502 may be included in the display 500. In some embodiments, the additional vehicles 502 may be computer-generated obstacles to be used in assessing the user's ability to process the driving environment after transitioning from autonomous driving to manual driving. In other embodiments, the additional vehicles 502 may correspond to one or more drivers executing the same simulation in the computer network. For example, one or more groups of client devices may execute the simulation concurrently. In turn, each vehicle rendered in the simulation may represent one group of client devices executing the virtual reality driving simulation. Multiple drivers may implement one or more groups of client devices to execute the simulation as part of driving education class activity and/or as a group of individuals performing the simulation in a "multi-player" mode.

The display 500 may also include interactive rearview mirrors 503. The rearview mirrors 503 may be adjusted by the driver during the simulation. Although only one rearview mirror 503 is included in the display 500, the virtual reality driving simulation may include multiple rearview mirrors 503 and/or side view mirrors. Additionally, the display 500 may include a simulated rearview camera screen as part of the display 500.

The display 500 may include one or more roads 504 capable of being traversed by the vehicle 501. In some embodiments, the roads 504 may correspond to real-life roads; whereas in other embodiments the roads 504 may be computer-generated and tailored to demonstrate certain driving-related rules and/or skills. In some embodiments, the roads 504 may be imported from an external service (e.g., Google® maps) as specified by the one or more input parameters. Accordingly, the virtual reality driving simulation may be able to provide the user with a realistic experience of driving in a real-life location. In some embodiments, the roads 504 may contain various obstacles and/or features specified by the input parameters or other information.

Markers 506 corresponding to various traffic signs (e.g., speed limit signs, stop signs, caution signs, one-way signs, dead end signs, parking signs, caution signs, etc.), street lights, and other roadway informational objects may be rendered alongside, above, and/or on the road 504. In the illustrated embodiment, the marker 506 is a stop sign. In some embodiments, the markers 506 may correspond to those specified by the one or more input parameters. The display 500 may further include a map 508 of the roads 504 rendered in the virtual reality driving simulation. In some embodiments, the map 508 may replicate the screen of a GPS device built-into the vehicle 501.

IV. Example Configuration

Figure 6:
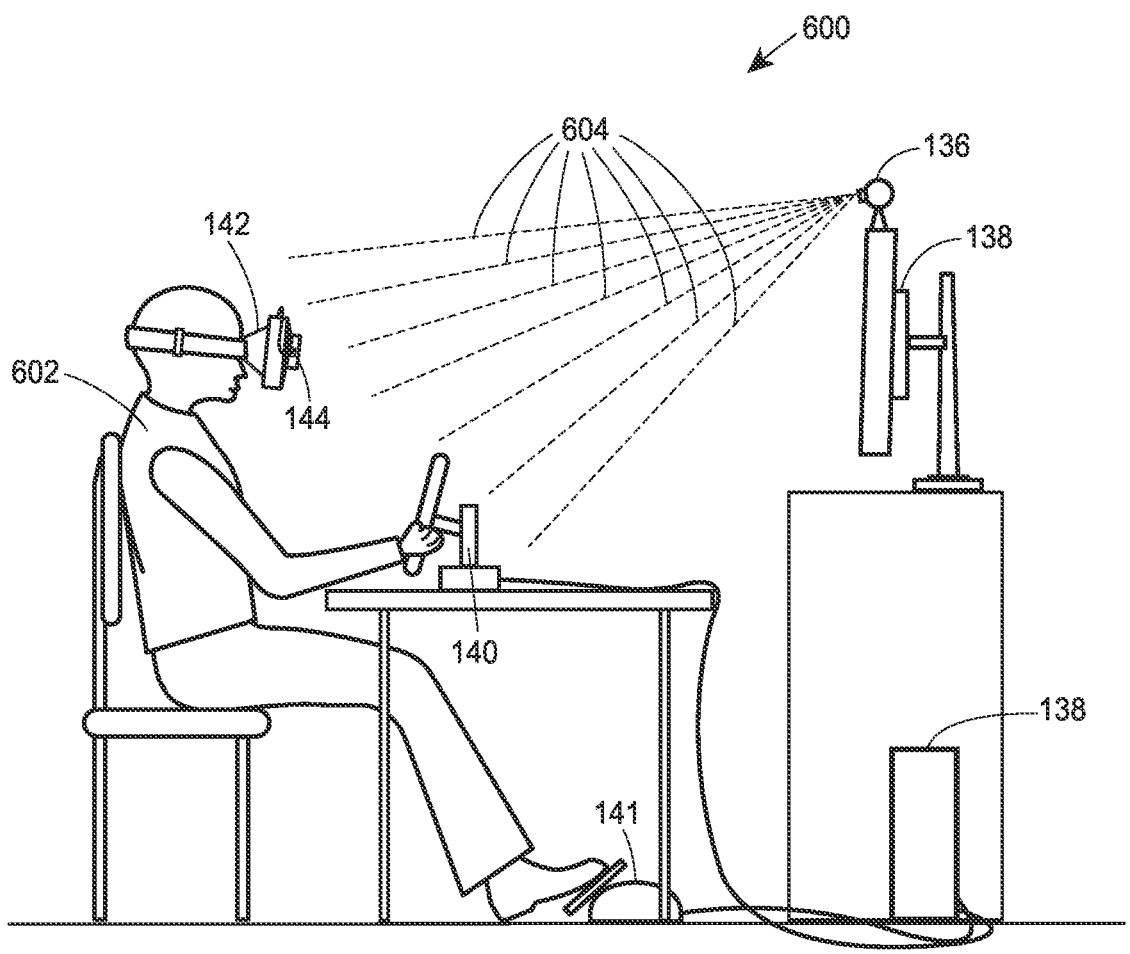
FIG. 6 is an illustration of one embodiment of a configuration of a virtual reality driving simulator in use.

FIG. 6 is an example configuration 600 of the front-end components of the system 100 and a user 602 during execution of the virtual reality driving simulation. Although the client devices 136-144 are shown to be connected via a wired connection, in other embodiments any combination of the client devices can be connected via a wired and/or wireless connection.

The configuration 600 is organized so that the HTU 136 may record the user 602 while the user 602 wears the VR device 142 (including the physiological device and the MS device 144) and manipulates the steering wheel 140 and the pedals 141. The configuration 600 is intended for illustrative purposes only and the client devices 136-144 can be configured in any suitable manner. The configuration 600 may be customizable based on the size and/or layout of an area where the client devices 136-144 are set up. Furthermore, it is noted that the configuration 600 may include additional client devices that are not pictured, such as video game controllers, a stick shift device, speakers, a mouse, key board etc.

The HTU 136 can be a video recording device, for example, and may record the movement of the user 602 throughout execution of the virtual reality driving simulation. Sight-lines 604 indicate a field-of-view of the HTU 136. In some embodiments, the HTU 136 may only record movement of the user's torso, arms, and head. The movements recorded by the HTU 136 during the virtual reality driving simulation may be transmitted as part of user performance data, as described above.

The VR device 142 and/or the MS device 144 may also record the user's head movements and/or eye movements throughout the execution of the virtual reality driving simulation. The user's body and/or eye movements can be used to determine part of the driving competency score. If the user's body movements are too quick or do not correspond correctly to elements of the virtual reality driving simulation, the user may receive a lower driving competency score. For example, if the user's eye and/or movements indicate that the user does not look at an object include in the practice driving scenario that was previously emphasized with the visual cue 420 during the instructional lesson, the user may receive a lower driving competency score.

The steering wheel 140 and/or pedals 141 may also be utilized to record user performance data throughout the execution of the virtual reality driving simulation. In some embodiments, the computer 138 may record the user performance data transmitted from the steering wheel 140 and/or pedals 141. The steering wheel 140 can detect how and when the user turns the simulated vehicle, and the pedals 141 may detect how the user accelerates, decelerates (e.g., brakes) the simulated vehicle. The user performance data representative of operation of the steering wheel 140 and/or pedals 141 may also be used as part of the determination of the driving competency score. If the user does not appropriately implement the steering wheel 140 and/or pedals 141 throughout execution of the virtual reality driving simulation, the user may receive a lower driving competency score.

V. Additional Considerations

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

For example, the network 106, may include, but is not limited to, any combination of a LAN, a MAN, a WAN, a mobile, a wired or wireless network, a private network, or a virtual private network. Moreover, it is understood that any number of client computers or display devices are supported and may be in communication with the data system 104.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, which may be one of an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of exemplary functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or functions described herein may be at least partially processor-implemented. For example, at least some of the functions of a method may be performed by one or more processors or processor-implemented hardware modules. The performance of certain of the functions may be distributed among the one or more processors, not only residing within a single machine, but deployed across a number of machines. In some exemplary embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors). These operations are accessible via a network (e.g., the Internet) and via one or more appropriate interfaces (e.g., application program interfaces (APIs)).

The performance of certain operations may be distributed among the one or more processors, not only residing within a single machine, but deployed across a number of machines. In some exemplary embodiments, the one or more processors or processor-implemented modules may be located in a single geographic location (e.g., within a home environment, an office environment, or a server farm). In other exemplary embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "function" or an "algorithm" or a "routine" is a self-consistent sequence of operations or similar processing leading to a desired result. In this context, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computer system 100 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and method for providing a driving simulator on a mobile device through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A computer-implemented method for autonomous vehicle driver situational awareness recovery training, comprising:

receiving, via a computer network, at least one input parameter corresponding to at least one feature to be rendered during a driving simulation;

determining, by one or more processors, a virtual reality driving simulation comprising (i) an autonomous vehicle having one or more levels of vehicle control (ii) a driving scenario;

receiving, via the computer network, user performance data recorded during execution of the virtual reality driving simulation on at least one head-mounted virtual reality device; and analyzing, by the one or more processors, the user performance data to determine a driving competency score measuring user recovery of situational awareness during the driving scenario of the virtual reality driving simulation.

2. The computer-implemented method of claim 1, further comprising:

generating, by the one or more processors, feedback based on the driving competency score.

3. The computer-implemented method of claim 2, wherein the driving scenario is a first learning module, and further comprising:

transmitting, via the computer network, the feedback for execution on the at least one head-mounted virtual reality device;

comparing, by the one or more processors, the driving competency score to a predetermined threshold;

if the driving competency score is below the predetermined threshold, generating the feedback to include an update to the driving scenario, to be rendered in virtual reality;

comparing, by the one or more processors, the driving competency score to a predetermined threshold; and if the driving competency score is equal to or above the predetermined threshold, the virtual reality driving simulation comprises a second learning module, to be rendered in virtual reality, for a user to practice situational awareness recovery.

4. The computer-implemented method of claim 3, wherein the first and second learning modules each comprises a different one of: the autonomous vehicle driving off course, the autonomous vehicle stopping, and the autonomous vehicle changing speed.

5. The computer-implemented method of claim 1, wherein the driving scenario further comprises at least one of (i) a continuous period of driving, (ii) an errant behavior by the autonomous vehicle, (iii) a continuous period of obstruction of a roadway scene, (iv) the roadway scene without obstruction, or (v) an audio and/or haptic cue.

6. The computer-implemented method of claim 1, wherein control of the autonomous vehicle comprises one or more of speed control of the autonomous vehicle and steering control of the autonomous vehicle.

7. The computer-implemented method of claim 1, wherein the user performance data is representative of at least one of: controls operated by a user during the virtual reality driving simulation, movement of a head of the user during the virtual reality driving simulation, movement of one or more eyes of the user during the virtual reality driving simulation, movement of one or more arms of the user during the virtual reality driving simulation, movement of one or more hands of the user during the virtual reality driving simulation, movement of a torso of the user during the virtual reality driving simulation, a heart rate of the user during the virtual reality driving simulation, a blood pressure of the user during the virtual reality driving simulation, a body temperature of the user during the virtual reality driving simulation, movement of one or more feet of the user during the virtual reality driving simulation, or a breathing characteristic of the user during the virtual reality driving simulation.

8. A computer-implemented method for autonomous vehicle driver situational awareness recovery training, comprising:
   receiving, via one or more client devices, at least one input parameter corresponding to at least one feature to be rendered during a virtual reality driving simulation;
   executing, via the one or more client devices, the virtual reality driving simulation such that a head-mounted virtual reality device renders at least: (i) an autonomous vehicle having a plurality of levels of vehicle control to be rendered in virtual reality, and (ii) a driving scenario to be rendered in virtual reality; and
   recording, via the one or more client devices, user performance data during execution of the virtual reality driving simulation.

9. The computer-implemented method of claim 8, wherein the driving scenario is a first learning module, and further comprising:
   transmitting, via the one or more client devices, the user performance data; and
   receiving, via the one or more client devices, feedback based on a driving competency score for execution on the head-mounted virtual reality device, wherein the driving competency score measures user recovery of situational awareness during the driving scenario of the virtual reality driving simulation;
   executing, via the one or more client devices, the feedback such that, if the driving competency score is below a predetermined threshold, the head-mounted virtual reality device renders an update to the driving scenario for a user to experience a consequence of a user performance;
   executing, via the one or more client devices, the feedback such that, if the driving competency score is equal to or above a predetermined threshold, the head-mounted virtual reality device renders at least a second learning module to be rendered in virtual reality.

10. The computer-implemented method of claim 9, further comprising: generating feedback based on the driving competency score.

11. The computer-implemented method of claim 9, wherein the first and second learning modules each comprises a different one of:
   the autonomous vehicle driving off course, the autonomous vehicle stopping, and the autonomous vehicle changing speed.

12. The computer-implemented method of claim 8, wherein the driving scenario further comprises at least one of (i) a continuous period of driving, (ii) an errant behavior by the autonomous vehicle, (iii) a continuous period of obstruction of a roadway scene, (iv) the roadway scene without obstruction, or (v) an audio and/or haptic cue.

13. The computer-implemented method of claim 8, wherein control of the autonomous vehicle comprises one or more of speed control of the autonomous vehicle and steering control of the autonomous vehicle.

14. The computer-implemented method of claim 8, wherein the user performance data is representative of at least one of: controls operated by a user during the virtual reality driving simulation, movement of a head of the user during the virtual reality driving simulation, movement of one or more eyes of the user during the virtual reality driving simulation, movement of one or more arms of the user during the virtual reality driving simulation, movement of one or more hands of the user during the virtual reality driving simulation, movement of a torso of the user during the virtual reality driving simulation, a heart rate of the user during the virtual reality driving simulation, a blood pressure of the user during the virtual reality driving simulation, a body temperature of the user during the virtual reality driving simulation, movement of one or more feet of the user during the virtual reality driving simulation, or a breathing characteristic of the user during the virtual reality driving simulation.

15. A system for driver training, comprising:
   one or more processors;
   a head-mounted virtual reality display device; and
   a non-transitory computer-readable medium storing instructions that, when executed by the one or more processors, cause the system to:
   receive at least one input parameter corresponding to at least one feature to be rendered during a virtual reality driving simulation;
   execute the virtual reality driving simulation such that a head-mounted virtual reality device renders at least: (i) an autonomous vehicle having a plurality of levels of vehicle control to be rendered in virtual reality, and (ii) a driving scenario to be rendered in virtual reality; and
   record user performance data during execution of the virtual reality driving simulation.

16. The system of claim 15, the non-transitory computer-readable medium storing instructions that, when executed by the one or more processors, cause the system to:
   receive feedback based on a driving competency score for execution on the head-mounted virtual reality device, wherein the driving competency score measures user recovery of situational awareness during the driving scenario of the virtual reality driving simulation and wherein the driving scenario is a first learning module;
   cause the system to execute the feedback such that, if the driving competency score is below a predetermined threshold, the head-mounted virtual reality device renders an update to the driving scenario;
   cause the system to execute the feedback such that, if the driving competency score is equal to or above a predetermined threshold, the head-mounted virtual reality device renders at least a second learning module, to be rendered in virtual reality, for a user to practice situational awareness recovery.

17. The system of claim 16, wherein the first and second learning modules each comprises a different one of:
   the autonomous vehicle driving off course, the autonomous vehicle stopping, and the autonomous vehicle changing speed.

18. The system of claim 16, the non-transitory computer-readable medium storing instructions that, when executed by the one or more processors, cause the system to:
   generate feedback based on the driving competency score.

19. The system of claim 15, wherein the driving scenario further comprises at least one of (i) a continuous period of driving, (ii) errant behavior by the autonomous vehicle, (iii) a continuous period of obstruction of a roadway scene, (iv) the driving scenario comprises the roadway scene without obstruction, or (v) an audio and/or haptic cue.

20. The system of claim 15, wherein control of the autonomous vehicle comprises one or more of speed control of the autonomous vehicle and steering control of the autonomous vehicle.

* * * * *